(12) United States Patent
Bescos Grillo et al.

(10) Patent No.: US 11,434,867 B2
(45) Date of Patent: Sep. 6, 2022

(54) HUB ASSEMBLY FOR A ROTOR OF A WIND TURBINE

(71) Applicant: General Electric Renovables España, S.L., Barcelona (ES)

(72) Inventors: Javier Bescos Grillo, Barcelona (ES); Josep Bosch-Collado, Barcelona (ES); John T. Olesen, Hamburg (DE); Przemyslaw Skierczynski, Warsaw (PL)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/004,131

(22) Filed: Aug. 27, 2020

(65) Prior Publication Data

US 2021/0062783 A1  Mar. 4, 2021

(30) Foreign Application Priority Data

Aug. 30, 2019 (EP) .................................... 19382741

(51) Int. Cl.
| | |
|---|---|
| *F03D 1/06* | (2006.01) |
| *F03D 80/70* | (2016.01) |
| *F03D 7/02* | (2006.01) |

(52) U.S. Cl.
CPC ......... *F03D 1/0658* (2013.01); *F03D 1/0691* (2013.01); *F03D 7/0224* (2013.01); *F03D 80/70* (2016.05); *F05B 2230/60* (2013.01); *F05B 2260/79* (2013.01); *F16C 2300/14* (2013.01); *F16C 2360/31* (2013.01); *Y02P 70/50* (2015.11)

(58) Field of Classification Search
CPC ...... F03D 1/0658; F03D 80/70; F03D 1/0691; F03D 7/0224; F05B 2240/14; F05B 2260/79; F05B 2230/60; Y02P 70/50
See application file for complete search history.

(56) References Cited

U.S. PATENT DOCUMENTS

| | | | |
|---|---|---|---|
| 9,115,698 B2 | 8/2015 | Segovia et al. | |
| 2006/0104820 A1* | 5/2006 | Delucis | F03D 1/0691 416/244 R |
| 2013/0280089 A1* | 10/2013 | Meesala | F03D 1/0691 416/244 R |
| 2014/0064971 A1 | 3/2014 | Sivanantham et al. | |
| 2014/0219804 A1* | 8/2014 | Bitsch | F03D 1/0658 416/215 |
| 2020/0149515 A1* | 5/2020 | Buch-Lorentsen | F16C 33/58 |

FOREIGN PATENT DOCUMENTS

| | | |
|---|---|---|
| EP | 2 653 719 A2 | 10/2013 |
| KR | 2012 0005275 A | 1/2012 |
| WO | WO 2004/090326 A1 | 10/2004 |

OTHER PUBLICATIONS

EPO Search Report, dated Mar. 19, 2020.

* cited by examiner

*Primary Examiner* — Christopher Verdier (74) *Attorney, Agent, or Firm* — Dority & Manning, P.A.

(57) ABSTRACT

A hub assembly or a rotor of a wind turbine includes a hub having openings to connect rotor blades thereto. The hub assembly includes a pitch bearing (3) and a pitch carrier positioned between the hub and the pitch bearing, the pitch carrier configured to support a pitch system for adjusting a blade pitch of the rotor blades. The pitch carrier includes a strip plate arranged between two opposite regions of a perimeter of the opening. A mounting structure attaches the strip plate to the hub.

9 Claims, 7 Drawing Sheets

HUB ASSEMBLY FOR A ROTOR OF A WIND TURBINE

The present disclosure relates to hub assemblies for a rotor of a wind turbine, and methods for manufacturing such hub assemblies.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

In conventional wind turbines, a pitch angle of the blade may be adjusted by an auxiliary drive system such as a pitch system in the hub, to adjust the load on the blade. Pitch systems usually have a series of components to adjust the pitch angle. Such components may be supported by a so-called "pitch carrier". Furthermore, pitch carriers are manufactured along with the hub in the same casting operation.

There is a trend to make larger wind turbines to capture more wind and convert the energy of the wind into electricity, e.g. the so-called "multimegawatt" wind turbines. This trend may lead to hub sizes greater than 5 meters of diameter. Thus, the issued hub casting weight, along with the pitch carrier, is on the limits of state-of-the-art manufacturing capabilities.

Furthermore, pitch carriers may have a relatively large and thin geometry which is not ideal for casting processes. However, if pitch carriers are alternatively manufactured from independent plates to fully cover an opening of the hub to receive a blade root in a "multimegawatt" wind turbine, the size of pitch carriers could exceed the size of common steel plates that can be found on the market. This may limit the size of the hub and so the wind turbine.

Moreover, as the openings of the hubs are become larger, the relatively large and thin geometry of the plates may cause the pitch carriers to undergo a significant bending.

In addition, assembling tasks of the pitch system to the hub have to be carried out at heights, particularly once the hub has been installed. This involves a risk of falling for the operators mounting the pitch system. Furthermore, assembling tasks at heights may make the installing tasks complex.

The present disclosure provides examples of hub assemblies, wind turbines and manufacturing methods that at least partially resolve some of the aforementioned disadvantages.

SUMMARY

In one aspect, a hub assembly for a rotor of a wind turbine is provided. The hub assembly comprises a hub comprising openings to connect rotor blades, a pitch bearing, a pitch carrier positioned between the hub and the pitch bearing and configured to support a pitch system for adjusting a blade pitch, wherein the pitch carrier comprises a strip plate arranged between two opposite regions of the perimeter of the opening, and a mounting structure for assembling the strip plate with the hub.

In this aspect, the inclusion of a pitch carrier which is independent from the hub may allow to minimize the hub casted weight, i.e. the hub casted weight may be optimized. Therefore, size of hub may be increased while the manufacturing capabilities may be secured. In addition, a manufacture of the hub may be facilitated.

Furthermore, as the pitch carrier may be separate from the hub, they may be obtained by a different manufacturing process.

Moreover, having an independent pitch carrier may allow to pre-assemble all pitch elements at floor level and work at height risks may be minimized. Thus, the assembling of a pitch system may be simplified and become safer.

In another aspect, a method for manufacturing a hub assembly of a wind turbine is provided. The wind turbine comprises a hub and a pitch carrier comprising a strip plate. The method comprises assembling the strip plate with the hub through a mounting structure.

In yet another aspect, a hub assembly for a rotor of a wind turbine is provided. The hub assembly comprises a hub comprising openings to connect rotor blades, a pitch bearing, a pitch carrier configured to support a pitch system for adjusting a blade pitch, wherein the pitch carrier is positioned between the hub and the pitch bearing, the pitch carrier comprising a strip plate assembled with a ring for assembling the strip plate with the hub, wherein the strip plate extends from one point of the ring to another diametrically opposite point.

The pitch carrier with the strip plate and the ring may provide the hub with the required stiffness at the opening for receiving the blade root without substantially increasing the weight of the hub assembly.

The connection of the blade to the bearing may be reinforced as well. Therefore, the connection may withstand vibrations that may occur when the hub is operating.

An embodiment of the invention encompasses: a hub assembly for a rotor of a wind turbine, the hub assembly comprising: a hub comprising a plurality of openings to connect rotor blades; a pitch bearing configured at each of the openings; a pitch carrier positioned between the hub and the pitch bearing at each of the openings and configured to support a pitch system for adjusting a blade pitch, wherein the pitch carrier comprises a strip plate with opposite end portions extending between opposite regions of a perimeter of the opening, the strip plate having opposite sides that extend chord-wise across and between locations on the perimeter of the opening, each of the end portions extending circumferentially along the perimeter of the opening between the opposite sides of the strip plate such that the end portions extend to less than a full circumference of the perimeter of the opening; and a mounting structure separate from the strip plate that directly engages and attaches the opposite end portions of the strip plate to the hub, the mounting structure comprising a releasable attachment configuration such that the opposite end portions of the strip plate are removable directly from the hub or directly from a separate ring mounted to the hub.

Further advantages derived from this aspect may be similar to those mentioned regarding the hub assembly of the first aspect.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
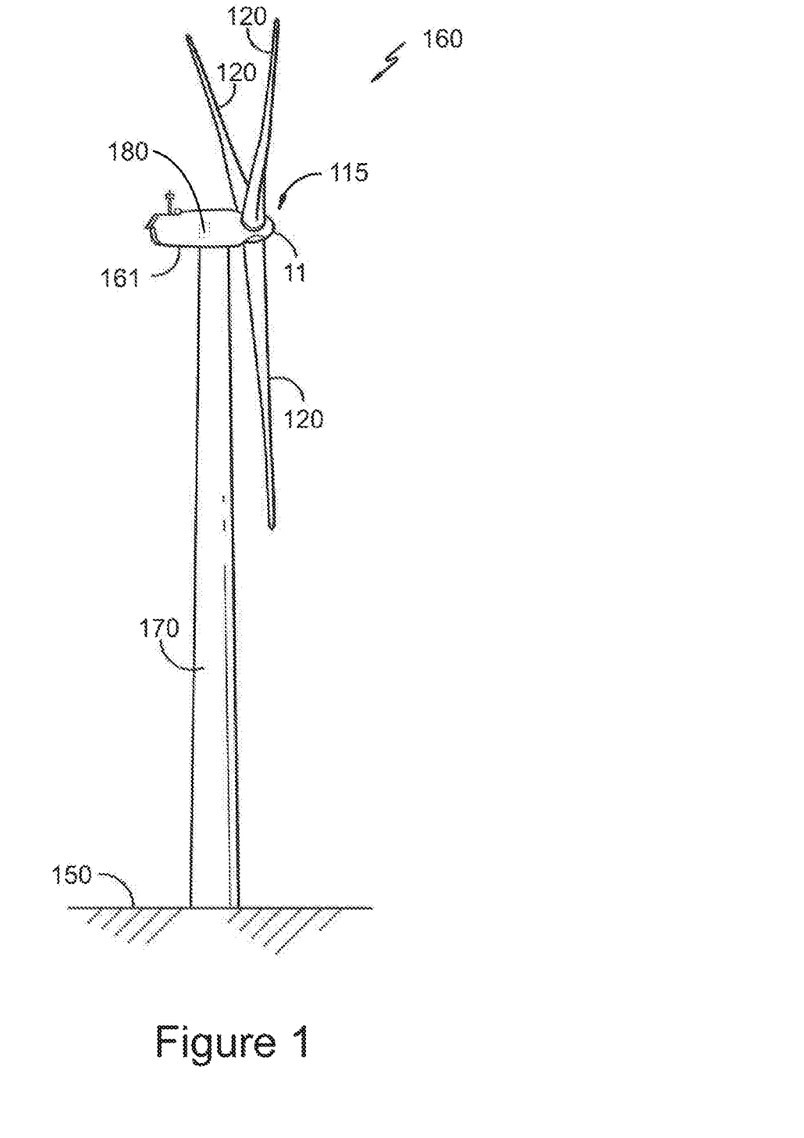
FIG. 1 illustrates a perspective view of a wind turbine according to one example.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 11 and at least one rotor blade 120 coupled to and extending outwardly from the hub 11. For example, in the illustrated example, the rotor 115 includes three rotor blades 120. However, in an alternative embodiment, the rotor 115 may include more or less than three rotor blades 120. Each rotor blade 120 may be spaced from the hub 11 to facilitate rotating the rotor 115 to enable kinetic energy to be transferred from the wind into usable mechanical energy, and subsequently, electrical energy. For instance, the hub 11 may be rotatably coupled to an electric generator positioned within the nacelle 161 or forming part of the nacelle to permit electrical energy to be produced.

The wind turbine 160 may also include a wind turbine controller 180 centrally located within the nacelle 161. However, in other examples, the wind turbine controller 180 may be located within any other component of the wind turbine 160 or at a location outside the wind turbine. Further, the controller 180 may be communicatively coupled to any number of components of the wind turbine 160, e.g. a pitch system 4 in order to control the operation of such components. By way of example, the controller 180 may control an auxiliary drive system such as the pitch system 4 for adjusting a blade pitch.

The wind turbine 160 of FIG. 1 may be placed in an offshore or onshore location.

The wind turbine controller (or "central control system") 180 may include one or more processor(s) and associated memory device(s) configured to perform a variety of computer-implemented functions (e.g., performing the methods, steps, calculations and the like and storing relevant data as disclosed herein). The wind turbine controller may perform various different functions, such as receiving, transmitting and/or executing wind turbine control signals and controlling the overall operation of the wind turbine. The wind turbine controller may be programmed to control the overall operation based on information received from sensors indicating e.g. loads, wind speed, wind direction, turbulence failure of a component and other.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor is also configured to compute advanced control algorithms and communicate to a variety of Ethernet or serial-based protocols (Modbus, OPC, CAN, etc.). Additionally, the memory device(s) may comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may be configured to store suitable computer-readable instructions that, when implemented by the processor(s), configure the controller to perform the various functions as described herein.

Figure 2:
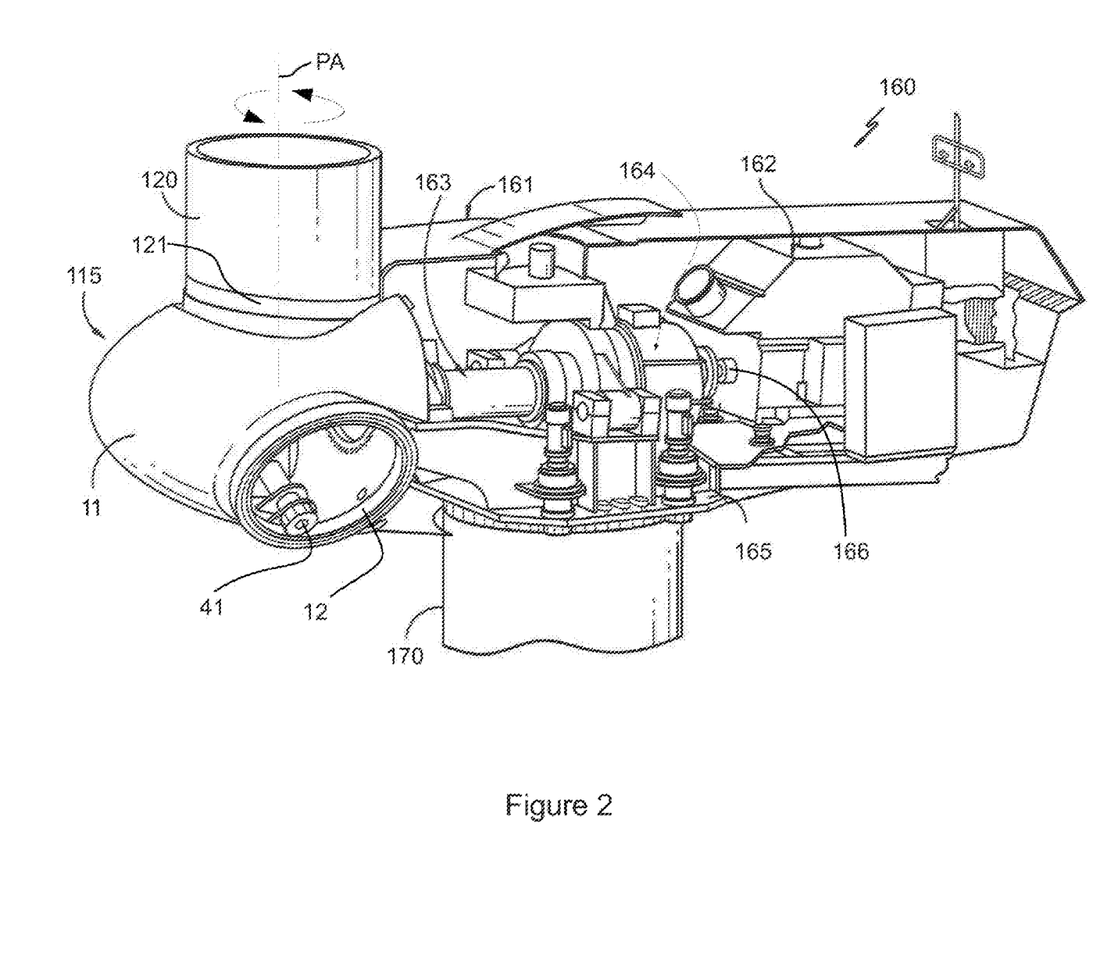
FIG. 2 illustrates a simplified, internal view of a nacelle of a wind turbine according to one example.

FIG. 2 illustrates a simplified, internal view of a nacelle 161 of a wind turbine 160 according to one example.

Figure 8:
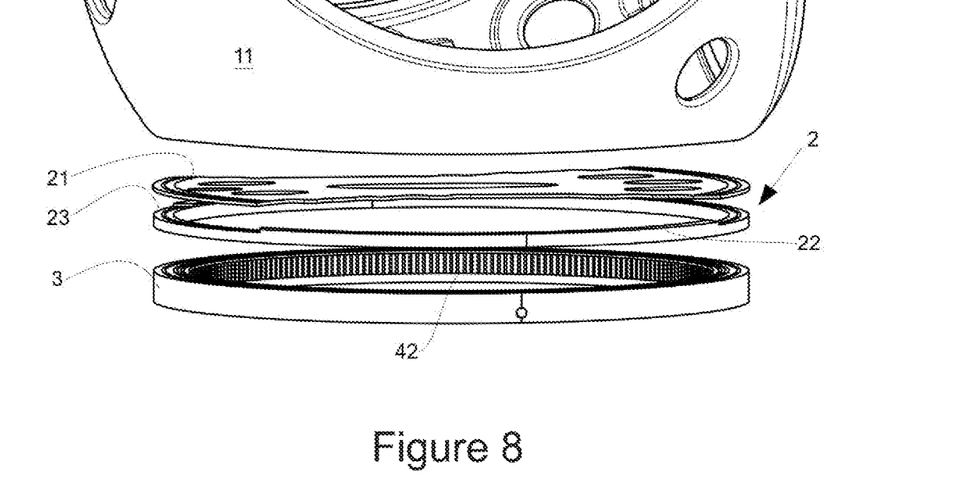
FIG. 8 illustrates a partial and exploded view of a hub assembly of the wind turbine of FIG. 1 according to yet another example.

Blades 120 are coupled to the hub 11 with a pitch bearing 3 in between the blade 120 and the hub 11. The pitch bearing 100 comprises an inner ring and an outer ring. A wind turbine blade 120 may be attached either at the inner bearing ring or at the outer bearing ring, whereas the hub 11 is connected at the other. A blade 120 may perform a relative rotational movement with respect to the hub 11 when the pitch system 4 is actuated. The rotational movement is performed around a longitudinal axis of the blade 120 and thus can be measured in degrees. A pitch angle or blade pitch of the rotor blade 120, i.e., an angle that determines a perspective of the rotor blade 120 with respect to the air flow past the wind turbine 160, may be defined by rotation of the rotor blade 120 about the pitch axis PA shown in FIG. 2. Due to this rotational movement about the pitch axis PA, the inner bearing ring may perform a rotational movement with respect to the outer bearing ring. The pitch system comprises a pinion of the pitch drive 41 (FIG. 5) that meshes with an annular gear 42 (see FIG. 8) provided on the inner bearing ring to set the wind turbine blade into rotation. Although FIG. 2 shows a pitch drive 41 attached to the hub 11 for the sake of clarity, the pitch drive 41 may be attached to some other parts to mesh with annular gear 42 of the pitch bearing 3.

A single pitch system or a plurality of individual pitch systems may be used to rotate the blades 120 around their longitudinal axes. The pitch system may adjust the pitch angle of multiple blades 120 at the same time.

Figure 3:
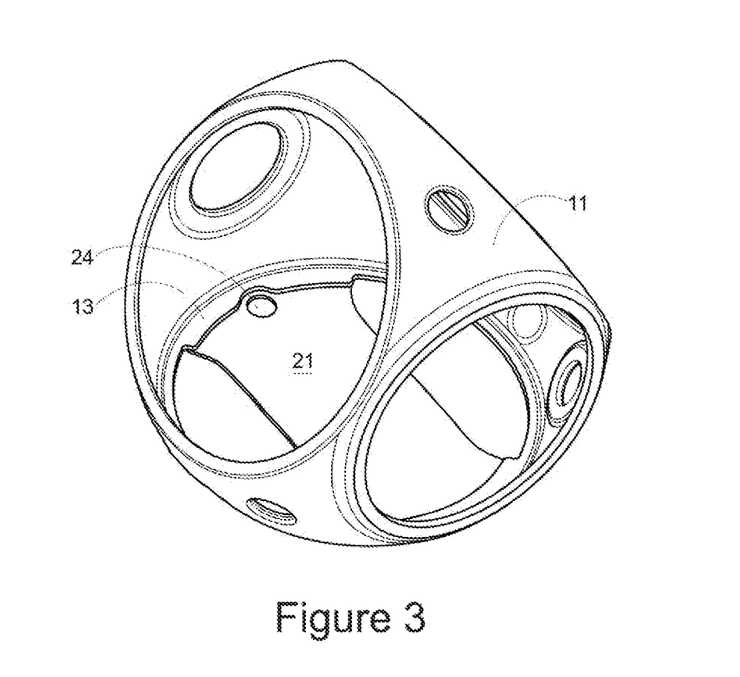
FIG. 3 illustrates a perspective view of a hub assembly of the wind turbine of FIG. 1 according to an example.
Figure 4:
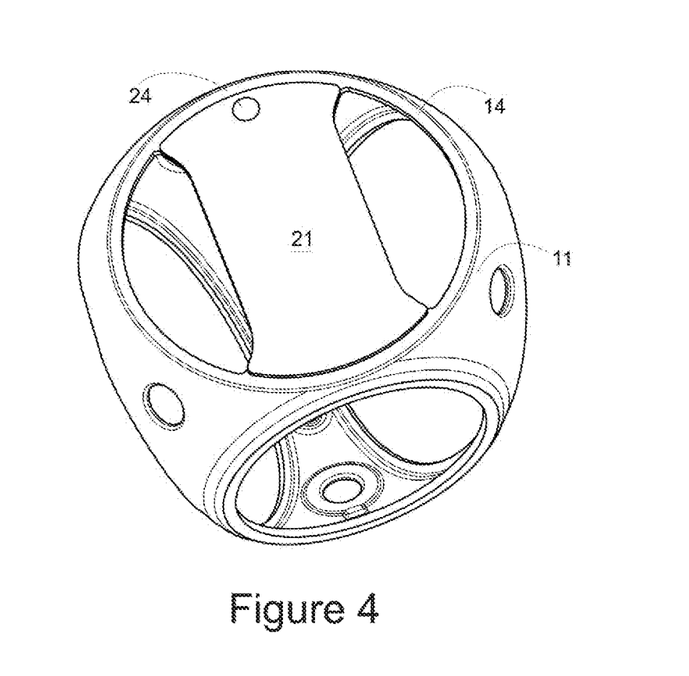
FIG. 4 illustrates a perspective view of the exemplary hub assembly of FIG. 3 seen from an opposite angle.

FIG. 3 illustrates a perspective view of a hub assembly 1 of the wind turbine 160 of FIG. 1 according to another example, and FIG. 4 illustrates the exemplary hub assembly of FIG. 3 seen from an opposite angle.

According to one aspect, a hub assembly 1 for a rotor 115 of a wind turbine is disclosed. The hub assembly 1 as per FIGS. 3 to 8 comprises a hub 11 comprising openings 12 to connect rotor blades 120, a pitch bearing 3, and a pitch carrier 2 positioned between the hub 11 and the pitch bearing 3 and configured to support a pitch system 4 for adjusting a blade pitch. The pitch carrier 2 comprises a strip plate 21 arranged between two opposite regions of the perimeter of the opening 12. The hub assembly further comprises a mounting structure for assembling the strip plate 21 with the hub 11.

The pitch carrier may thus be independent from the hub. Accordingly, they may be obtained by a different manufacturing process. A generally flat strip plate may be manufactured from a plate whose size may be easily found in the market. The shape of the strip plate may be obtained through any cutting method available in the art.

In this disclosure, strip plate refers to a substantially elongated plate. The strip plate extends along a length between two ends to be connected at opposite regions of the perimeter of the opening. A width of the strip plate refers to an extension of the strip plate along a direction perpendicular to the length. The width of the strip plate is shorter than the length of the strip plate.

The strip plate does not fully cover the opening. The strip plate may thus extend along a surface smaller than the area of the opening. Accordingly, the overall weight of the hub assembly may be optimized.

The hub 11 and the pitch carrier 2 may be separate from each other. The latter may mean that the hub 11 and the pitch carrier 2 are not integrally formed.

According to one example the strip plate 21 and the hub 11 may be obtained from different materials and manufacturing methods from each other. By way of example, the strip plate 21 may be produced from a blank such as a steel plate and the hub 11 through casting. The strip plate 21 may have a generally planar and elongated configuration. If the opening 12 is generally circular-shaped then the opposite regions of the perimeter of the opening 12 where the strip plate 21 is arranged, are substantially diametrically opposite to each other.

The mounting structure may be an angular segment. In some examples, the mounting structure may be integrally formed with the hub, e.g. supporting rims or supporting protrusions. In some examples, the mounting structure may be a separate structure, e.g. a ring, to be attached to the hub.

In one example, the mounting structure may comprise one or more supporting rims 13 formed integrally with the hub 11 and extending inwardly from the perimeter of the opening 12. The strip plate 21 may be attached to the supporting rims 13. This example can be seen in FIGS. 3 and 4. The supporting rim 13 may be arranged at least in a portion of the perimeter of the opening 12.

In another example of this aspect, the pitch carrier 2 may be positioned between the supporting rims 13 and the pitch bearing 3.

According to a further example, the mounting structure may have two supporting rims 13 disposed opposite to each other.

In a hub assembly 1 according to a yet another example of this aspect, the strip plate 21 may be fastened to the supporting rims 13 through end portions 211 of the strip plate 21.

Figure 10:
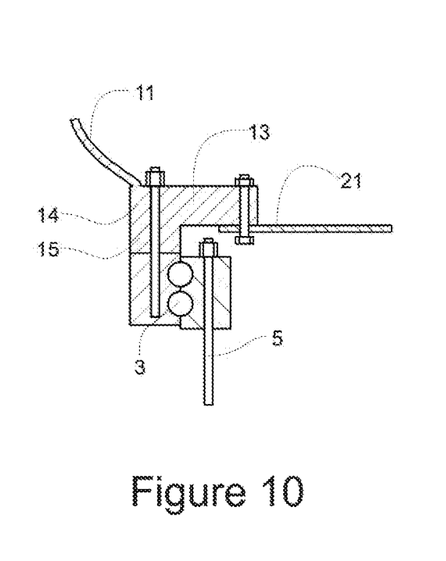
FIG. 10 illustrates a partial cross-sectional view of the exemplary hub assembly of FIG. 3.

Referring to FIG. 10, the hub 11 may comprise mounting flanges 14 about the openings. The mounting flanges 14 may extend outwardly from the rest of the hub 11 towards the pitch bearing 3. The pitch bearing 3 may be attached to the hub through the mounting flanges 14. One or more mounting flange 14 may be arranged substantially surrounding the opening 12. In one example, the hub assembly 1 may comprise a single mounting flange 14.

The mounting flanges 14 may be extended, by annular protrusions 15, to allow creating enough space between bearings 3 and hub 11 to accommodate bolts 5, such as T-bolts. Bolts 5 may fasten bearings 3 and blades 120.

In some examples, the supporting rims 13 may therefore extend from the mounting flange 14.

In some examples, the mounting structure and the strip plate 21 may form the pitch carrier 2 and the mounting structure may comprise a ring 22 arranged at the perimeter of the opening 12, the strip plate 21 may extend from one point of the ring 22 to another diametrically opposite point. See for instance FIG. 5.

The strip plate 21 and the ring 22 may be separate from each other. This example can be seen in FIGS. 5 to 8. The strip plate 21 and the ring 22 may be manufactured from different material and through different processes. Furthermore, the strip plate 21 and the ring 22 may be manufactured at different sites and moments.

The ring may radially reinforce the opening. The latter may be achieved without the need of fully covering the opening of the hub to receive the blade root.

The strip plate may be easier to connect to the hub by means of the presence of the ring.

Furthermore, the ring may be produced through a different process from the strip plate or the hub. The ring may be manufactured by casting.

Figure 9:
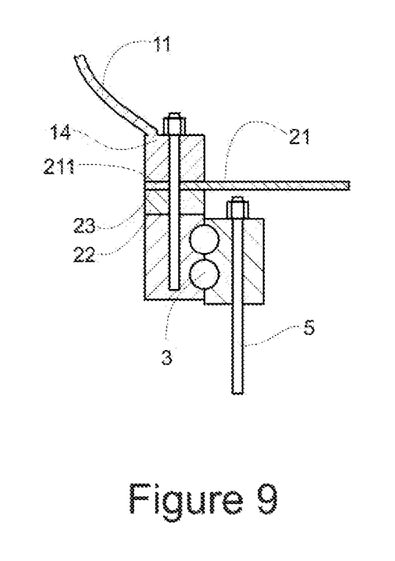
FIG. 9 illustrates a partial cross-sectional view of the exemplary hub assembly of FIG. 6.

In some examples, the ring 22 may be attached to the mounting flange 14. For example, the ring may be sandwiched between the mounting flange 14 and the pitch bearing as illustrated in FIG. 9. A plurality of bolts may be secured on a plurality of threaded holes arranged in the pitch bearing. These bolts may pass through the ring and the mounting flange.

Figure 6:
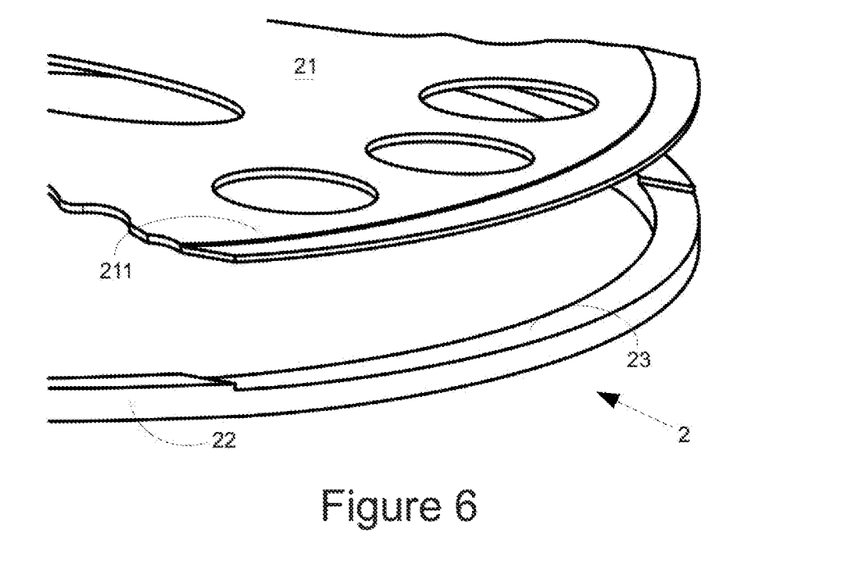
FIG. 6 illustrates a partial and exploded view of an exemplary pitch carrier of the hub assembly of FIG. 5.
Figure 7:
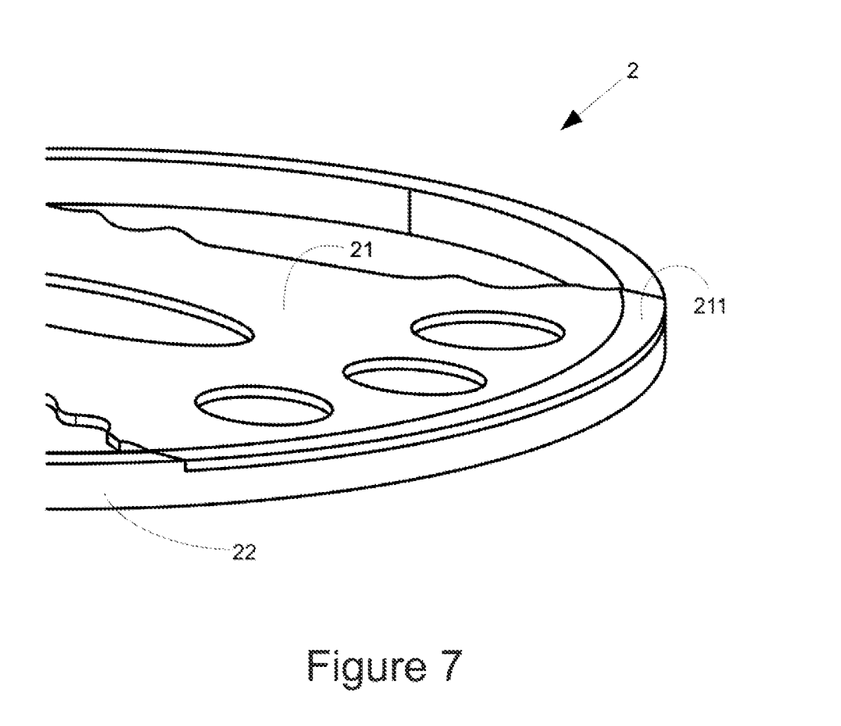
FIG. 7 illustrates a partial view of the pitch carrier of the example of FIG. 6 assembled.

Referring to FIGS. 6 and 7, end portions 211 of the strip plate 21 may be fitted or embedded in the ring 22. The overall width of the pitch carrier 2 may correspond to the width of the ring 22.

Continuing with FIGS. 6 and 7, the ring 22 may have a pair of recesses 23 to receive the end portions 211 of the strip plate 21. The strip plate 21 may be provided between the hub 11 and the ring 22.

Figure 11:
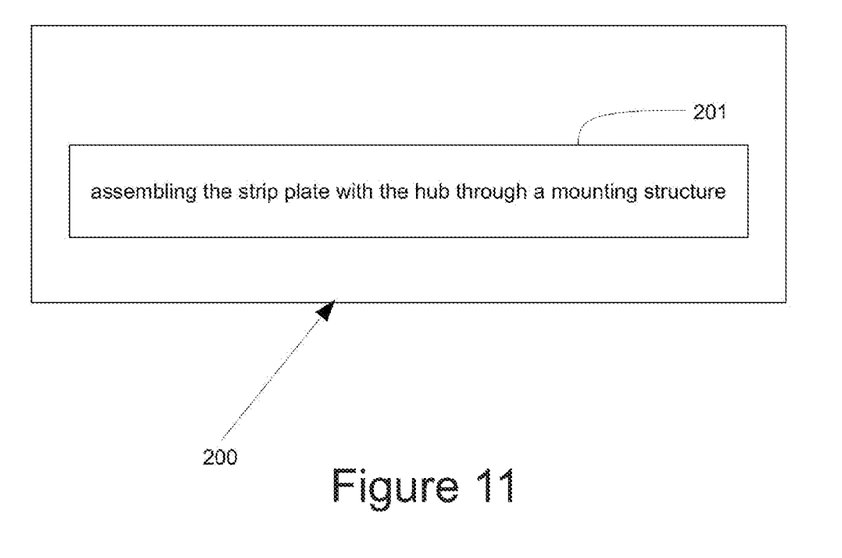
FIG. 11 shows a flowchart of a method for manufacturing a hub assembly according to one example.

FIG. 11 shows a flowchart of a method for manufacturing a hub assembly according to one example. The wind turbine 160 may be as illustrated in FIG. 1 and the hub assembly 1 may be any of the herein disclosed examples.

According to an aspect, a method 200 for manufacturing a hub assembly 1 of a wind turbine 160 is disclosed. The wind turbine 160 comprises a hub 11 and a pitch carrier 2 comprising a strip plate 21. The method comprises assembling 201 the strip plate with the hub 11 through a mounting structure.

In some examples, the method may comprise assembling a pitch system with strip plate and attaching the plate supporting the pitch system to the hub through the mounting structure.

In one example of the method 200, assembling 201 the strip plate 21 with the hub 11 may comprise positioning the strip plate 21 between the hub 11 and a ring 22 of the mounting structure.

In another example of the method 200, in which the ring 22 may have two opposite sides, one facing the hub 11 and another facing away from the hub 11, the method may further comprise attaching the strip plate 21 to the ring 22 to form the pitch carrier 2 and machining both sides of the ring 22 and the strip plate 21 before assembling the pitch carrier 2 with the hub 11.

The method 200 according to a further example may comprise fitting the strip plate 21 in the ring 22 such that the overall width of the pitch carrier 2 corresponds to the width of the ring 22.

According to an example for carrying out the method 200, the hub 11 may be placed at floor level on the support surface 150 at the building site or at a factory site. Operators may assembly the pitch carrier with the hub 11. The hub assembly 1 may comprise a pitch carrier 2 and a mounting structure which may comprise one or more supporting rims 13 or a ring 22. When the mounting structure comprises one or more supporting rims 13, the strip plate 21 may be attached to the supporting rims 13. The strip plate 21 may be provided along with the pitch drive 41. When the mounting structure comprises a ring 22, the strip plate 21 and the ring 22 may be in a pre-assembled status or the ring 22 and the strip plate 21 may be joined together in the site. The strip plate 21 may be also provided along with the pitch drive 41. In both cases, the hub 11 along with the pitch carrier 2, the mounting structure, the pitch drive 41 and the pitch bearing 3 may be lifted to a predefined location in the wind turbine 160 using a crane or the like. Blades 120 provided with suitable joining elements such as T-bolts at their roots 121 may be attached to the pitch bearing 3 at height. Joining elements may be actuated to fasten the blades 120.

The example for carrying out the method 200 may be related to manufacturing and lifting the hub assembly 1 to a nacelle 161 mounted atop a tower 170. The method 200 may also be performed conversely, that is to say lowering the hub assembly 1 from the nacelle 161 and disassembling the different components of the hub assembly 1.

According to yet another aspect, a hub assembly 1 for a rotor of a wind turbine 160 is disclosed. As illustrated in FIGS. 5 to 8, the hub assembly 1 comprises a hub 11 comprising openings 12 to connect rotor blades 120, a pitch bearing 3 and a pitch carrier 2 configured to support a pitch system 4 for adjusting a blade pitch. The pitch carrier 2 is positioned between the hub 11 and the pitch bearing 3. The pitch carrier 2 comprises a strip plate 21 assembled with a ring 22 for assembling the strip plate 21 with the hub 11. The strip plate 21 extends from one point of the ring 22 to another diametrically opposite point of the ring 22.

The hub 11 and the pitch carrier 2 may be separate from each other. Thus, the hub 11 and the pitch carrier 2 may be obtained from different manufacturing processes.

The strip plate 21 may have a generally planar and elongated configuration so the strip plate 21 may contact the ring 22 in at least a pair of regions or points of the ring 22 which may be diametrically opposite to each other. The strip plate 21 may be disposed along a diameter of the ring 22, i.e. the strip plate 21 may be provided across the ring 22, passing through the middle of the ring 22.

A pitch carrier formed from two separate pieces may mean an optimized shape and configuration and so the manufacturing capabilities may be optimized.

A sandwich-configuration may be defined by the hub 11, the ring 22 and the strip plate 21 arranged in-between.

According to one example the strip plate 21 and the ring 22 may be obtained from different materials and manufacturing methods from each other. By way of example, the strip plate 21 may be produced from a blank such as a steel plate and the shape of the plant may be achieved through oxycut, plasma, sawing, shearing or the like. The ring 22 may be obtained through a casting process.

Ring 22 and strip plate 21 may be assembled together at a factory, at a building site of the wind turbine 160 or at any other locations. Therefore, flexibility in manufacturing, transport or assembling of the pitch carrier 2 may be enhanced.

Regarding the hub 11, it may be manufactured through a casting process which may be the same or a different one from the process performed to obtain the ring 22.

Referring to the example illustrated in FIGS. 6 and 7, the strip plate 21 may have end portions 211 opposite to each other. The end portions 211 of the strip plate 21 may be fitted or seated in the ring 22. The latter may occur when the pitch carrier 2 is in an assembled status, e.g. the case illustrated in FIG. 7. Thanks to the fitting connection between the strip plate 21 and the ring 22, a minimized overall pitch carrier weight may be achieved.

Once assembled, the overall width of the pitch carrier 2 may correspond to the width of the ring 22, as per FIG. 7. This may allow minimizing the size of the pitch carrier and so a more compact design of the hub assembly. The shape and size of the pitch carrier may be optimized.

Moreover, the ring 22 may have two opposite sides one to face the pitch bearing 3 and another one to face the hub 11. The two opposite sides may be machined along with the strip plate 21. When the pitch carrier 2 is assembled, the pitch carrier 2 may be machined to allow a suitable fitting with the hub 11 and the pitch bearing 3. Thanks to the machining the weight of the pitch carrier 2 may be reduced even though the pitch carrier 2 may be split into two parts.

According to one example, the ring 22 may have a pair of recesses 23 to receive end portions 211 of the strip plate 21. End portions 211 and recesses 23 may be configured to match each other, at least partially. This way, the strip plate 21 may be easily joined together with the ring 22.

Furthermore, a snap fit may be defined between the recesses 23 and the end portions 211 of the strip plate 21. Strip plate 21 and ring 2 may be joined together without any fastening element. However, the strip plate 21 may be fastened to the ring 22 through end portions 211 of the strip plate 21.

Figure 5:
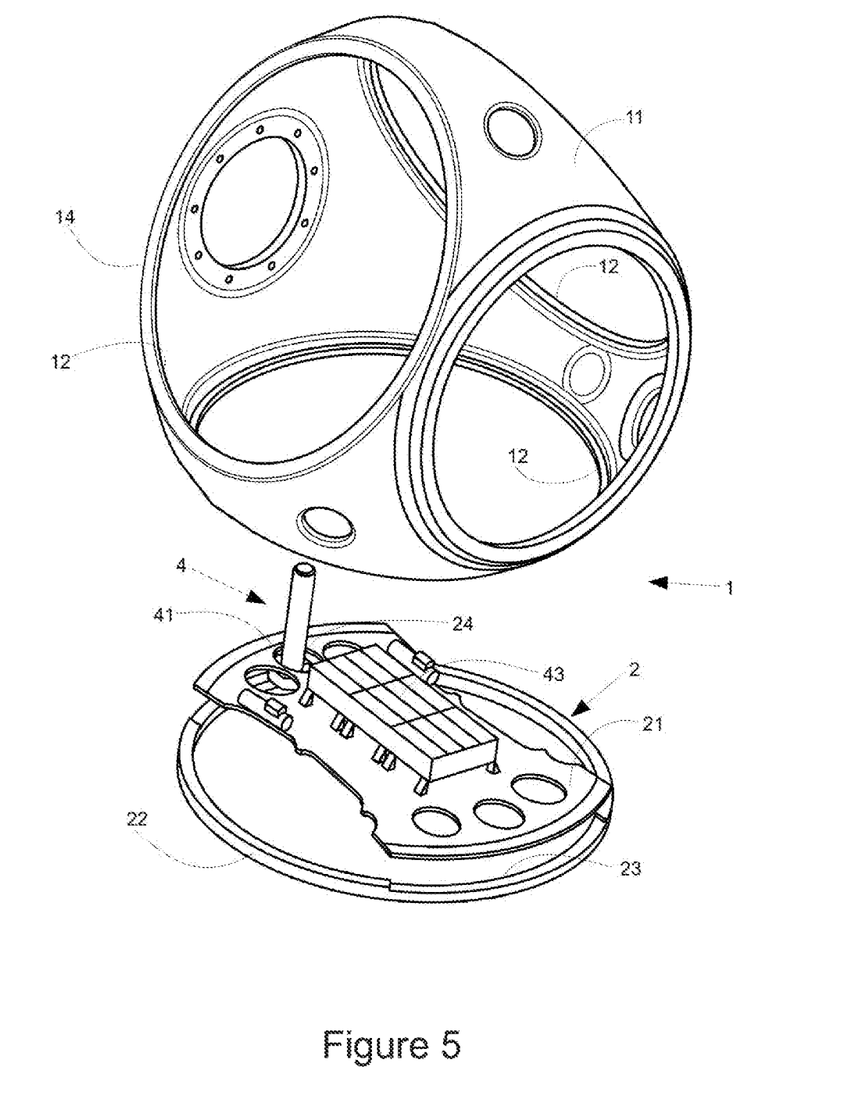
FIG. 5 illustrates a partial and exploded view of a hub assembly of the wind turbine of FIG. 1 according to a further example.

FIG. 9 illustrates a partial cross-sectional view of the exemplary hub assembly 1 of FIG. 5. In the example of FIG. 9, the strip plate 21 is provided between the hub 11 and ring 22. The end portions 211 are disposed between the hub 11 and the recess 23. It can be seen in the same example that the ring 22 is provided between the strip plate 21 and the pitch bearing 3.

Following with FIG. 9, the presence of the ring 22 may allow creating enough space between the strip plate 21 and the bearings 3 to handle mounting bolts 5 which are envisaged to fasten bearings 3 and blades 120.

Referring now to FIG. 5, the strip plate 21 may support a pitch system 4 according to one example. Alternatively, the strip plate 21 may support at least a part of the pitch system 4. The strip plate 21 may have a hole 24 for a pitch drive 41. This way, the pitch drive 41 may interact with the annular gear 42 provided on the inner bearing ring to set the wind turbine blade 120 into rotation. The pitch system 4 may also comprise supercaps 43 or the like to feed the pitch drive 41 with power if needed.

According to one example, the hub 11 may comprise mounting flanges 14 about the openings 12. The mounting flanges 14 extend outwardly from the rest of the hub 11 to contact the ring 22.

According to another example, the strip plate 21 may have end portions 211 with a cross-section larger than the rest of the strip plate 21. This may be seen from above, i.e. a top view. The end portions 211 may be configured wider than the rest of the strip plate when seen in a top view.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A hub assembly for a rotor of a wind turbine, the hub assembly comprising:
 a hub comprising a plurality of openings to connect rotor blades;
 a pitch bearing configured at each of the openings;
 a pitch carrier positioned between the hub and the pitch bearing at each of the openings and configured to support a pitch system for adjusting a blade pitch, wherein the pitch carrier comprises a strip plate with opposite end portions extending between opposite regions of a perimeter of the opening, the strip plate having opposite sides that extend chord-wise across and between locations on the perimeter of the opening, each of the end portions extending circumferentially along the perimeter of the opening between the opposite sides of the strip plate such that the end portions extend to less than a full circumference of the perimeter of the opening; and
 a mounting structure separate from the strip plate that directly engages and attaches the opposite end portions of the strip plate to the hub, the mounting structure comprising a releasable attachment configuration such that the opposite end portions of the strip plate are removable directly from the hub or directly from a separate ring mounted to the hub.

2. The hub assembly according to claim 1, wherein the mounting structure comprises a supporting rim segment formed integrally with the hub at each location of the opposite end portions of the strip plate along the perimeter of the opening and extending radially inwardly from the perimeter of the opening, wherein each of the opposite end portions of the strip plate are attached to a respective one of the supporting rim segments.

3. The hub assembly according to claim 2, wherein the pitch carrier is positioned between the supporting rim segments and the pitch bearing.

4. The hub assembly according to claim 2, wherein the hub comprises mounting flanges about each of the openings extending outwardly towards the pitch bearing and wherein the pitch bearing is supported by the mounting flanges.

5. The hub assembly according to claim 2, wherein the mounting structure comprises two of the supporting rim segments disposed radially opposite to each other.

6. The hub assembly according to claim 1, wherein the ring of the mounting structure is arranged at the perimeter of the opening, the opposite end portions of the strip plate attached to the ring to another at diametrically opposite points of the ring.

7. The hub assembly according to claim 6, wherein an overall width of the pitch carrier corresponds to a width of the ring.

8. The hub assembly according to claim 6, wherein the ring has recesses in which the end portions of the strip plate are seated.

9. The hub assembly according to claim 6, wherein the strip plate is provided between the hub and the ring.

* * * * *